(12) United States Patent
Erichsen et al.

(10) Patent No.: US 7,075,033 B2
(45) Date of Patent: Jul. 11, 2006

(54) LOW COST TITANIUM WELDING METHOD

(75) Inventors: Thomas David Erichsen, Los Altos, CA (US); Thomas James Dorsch, Los Gatos, CA (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 0 days.

(21) Appl. No.: 11/184,450

(22) Filed: Jul. 19, 2005

(65) Prior Publication Data

US 2005/0252901 A1 Nov. 17, 2005

Related U.S. Application Data

(63) Continuation of application No. 10/163,050, filed on Jun. 5, 2002, now abandoned.

(51) Int. Cl.
*B23K 9/173* (2006.01)

(52) U.S. Cl. .............................. 219/137 WM; 219/74

(58) Field of Classification Search ....... 219/137 WM, 219/74, 75; 148/421; 420/417, 418, 419, 420/420, 421
See application file for complete search history.

(56) References Cited

U.S. PATENT DOCUMENTS

| | | |
|---|---|---|
| 2,819,383 A | 1/1958 | Johnston |
| 3,309,496 A | 3/1967 | Rosenberg |
| 5,358,686 A | 10/1994 | Parris et al. |
| 5,393,948 A | 2/1995 | Bjorkman, Jr. |
| 6,392,184 B1 | 5/2002 | Yokota et al. |
| 6,538,234 B1 | 3/2003 | Toyoda et al. |

OTHER PUBLICATIONS

Boyer et al., Materials Properties Handbook: Titanium Alloys, "Technical Note 10: Welding and Brazing", pp. 159-164, no date.
Ellis et al., "Tungsten Inert gas welding of titanium and its alloys", Welding & Metal Fabrication, published Jan. 1995, pp. 9-12.
"Facts About Welding Titanium", published by RMI, Inc., pp. 7-8, no date.
"Titanium Design and Fabrication Handbook for Industrial Applications," published by TITMET< p. 30, no date.
Downing, "The Welding of Titanium for Ground Combat Vehicles", Poster Session, p. 331, no date.
Lewis et al., "Fabrication of Thick Titanium Plate for Submarine Hulls", National Aero-Nautical Meeting, Washington D.C., Apr. 1963, one page excerpt.
"Military Standard Fusion Welding For Aerospace Applications" Mil-Std-2219, Dec. 30, 1988, pp. 17-18.
Kearns, ed., Welding Handbook, 7th edition, vol. 4, "Metals and their Weldability", published 1982, p. 448.
Donachie, Jr., Titanium a technical guide, ASM International, published 1988, p. 132.

*Primary Examiner*—Clifford C. Shaw
(74) *Attorney, Agent, or Firm*—Patterson, Thuente, Skaar & Christensen, P.A.

(57) ABSTRACT

Method of welding titanium using gas metal arc welding procedure where the shielding for the weld included torch shielding gas only and no trailing or backup shielding. The technique used here is a departure from known titanium welding specifications wherein extensive shielding is required.

10 Claims, No Drawings

LOW COST TITANIUM WELDING METHOD

RELATED APPLICATION

This application is a continuation of application Ser. No. 10/163,050 filed Jun. 5, 2002, now abandoned.

BACKGROUND AND SUMMARY OF THE INVENTION

This invention relates to a method of welding of titanium and titanium alloys generally, and more particularly to such a method that is less complicated and less expensive that conventional methods, and thus is suitable for commercial practice.

Titanium alloys are considered to be "reactive metal," i.e., they react with atmospheric gases, such as oxygen as well as nitrogen, when at elevated temperature. Because of this, titanium processing such as melting and casting are typically performed in a vacuum or in an inert gas environment. Contamination with oxygen or nitrogen will embrittle the titanium. Similar considerations are used when welding titanium alloys.

Currently, those knowledgeable in the art, use welding procedures for titanium that dictate complete shielding of welds until cooled using inert argon gas. One such common procedure is manual gas tungsten arc welding, which is a slow and laborious process. In addition, inspecting for weld discoloration, is another step in the process that generally results in more rework. These requirements are onerous, requiring that welding small parts be conducted inside an inert gas chamber, to building dedicated local inert gas shields for each weld joint, to adding cumbersome "trailing shields" behind the torch that continue to cover the hot weld metal with inert gas until the weld has cooled sufficiently. All these techniques restrict access and the ability of the welder to manipulate the torch to achieve good weld quality. And, the necessity to use these devices increases the difficulty and time required to produce a weld. Due to these more stringent requirements, labor hours required to weld a given weldment design are a minimum of five times more than required for a similar steel component.

Contamination of titanium with oxygen or nitrogen, and thus the quality of the weld from a strength standpoint, has traditionally been determined by the color of the weld surface. The reaction with oxygen and/or nitrogen creates a thin oxide or nitride (?) layer on the surface with the thickness of the layer being related to the color, and therefore the amount of contamination. For instance, a shiny silver colored weld indicates no contamination, straw or gold color indicates there is a minor amount of contamination and blue or purple indicates significant levels and brown or grey indicates gross contamination. Inspectors must be provided with weld color standards used for comparison purposes. Other methods of assessing contamination include portable hardness test methods and eddy current non-destructive inspection methods. This is the current state of the art in titanium welding.

Weldments produced by the method of the present invention are made using the conventional Gas Metal Arc Welding (GMAW) process without the use of additional auxiliary shielding devices, such as trailing shields, glove boxes, purge chambers, back-up shields or other shielding devices. Deposited weld metal and heat affected zones are not additionally shielded from the atmosphere by inert gas, except by gas supplied by the torch through the standard gas cup associated with conventional GMAW welding torches. The resultant weld surface color is not an indicator of the weld properties. Any weld color from shiny silver, to blue, grey or brown and scaled, is acceptable by this process. The weld properties thus obtained meet all requirements for tensile and yield strength, elongation and bend ductility. Actual weld properties obtained in weldments of alloy Ti-6Al-4V typically have a tensile yield strength of 128 ksi, ultimate tensile strength of 143 ksi, over 10% elongation and sufficient ductility to be bent around a radius 8 times the thickness in any direction. In addition, welds are of sound quality without abnormal levels of weld defects such as porosity, lack of fusion or lack of penetration. The only non-destructive testing required are the standard welding inspection processes for geometrical weld defects and inclusions such as foreign material. No testing of color or surface hardness is necessary to confirm that mechanical properties are not affected, such as by embrittlement. Acceptability of any weldment made by the method of the present invention is completely independent of the color of the weld surface.

DESCRIPTION OF THE PREFERRED EMBODIMENT

The equipment utilized to practice the present invention is conventional gas metal arc welding (GMAW) equipment using conventional welding power supplies and torches, the same as those commonly used for GMAW of steel or aluminum. The GMAW process entails feeding a consumable wire through a torch with an electrical contact to energize the wire at the tip of the torch. The contact and wire are concentrically surrounded by an inert gas cup which directs the gas onto the deposited weld and around the filler wire that extends a short distance from the torch to the weld itself. Argon gas is the usual inert gas used for shielding the molten weld pool. An arc is created between the electrically charged filler wire that is fed through the torch and the base metal that has the opposite electrical charge. The resulting weld may be discolored due to oxidization of the hot metal deposited weld metal, i.e., not shiny silver in color, and instead is usually discolored to the point of being beyond blue or violet, to the point of being discolored to a tan or brown with a distinct deposit or oxide layer. Inspection for weld color is not necessary as all welds made using this process can be demonstrated to meet requirements for freedom of embrittlement, by measuring weld ductility. A method for welding titanium and titanium alloy using a process that does not use auxiliary inert gas shielding methods or devices. The only inert gas shielding provided is that associated with a standard GMAW torch, using the usual gas flow rates, which shielding is provided for the molten metal pool only.

The method of the present invention has been found to work in welding titanium and titanium alloy materials, especially those suited for structural or ballistic weld applications, e.g. Ti-6Al-4V, Ti-6Al-4V ELI, Ti-6Al-4V with up to 0.30% oxygen content. The filler metal, consisting of spooled wire, has a chemical composition similar to that of the base material, i.e., the alloy materials. However, the oxygen content of the filler metal must be less than the maximum permitted by the base material specification. There is some increase in oxygen content of the deposited weld metal; however, the increase results in the deposited filler metal having an oxygen content higher than the filler metal, but less than the maximum permitted by the base material specification. As a consequence, the weld maintains good ductility. The filler wire used is readily available commercial filler metal meeting AWS (American Welding Society) or AMS (Aerospace Material Specification) requirements. The inert gas used for this process is welding grade argon, essentially 100% pure. Either compressed gas bottles or liquefied argon locally stored and gasified are acceptable. Gas flow rates are typical of those used for welding steel or aluminum, 30–75 cubic feet per minute.

What is claimed is:

1. A method for welding titanium and titanium alloy using gas metal arc welding equipment comprising:
   selecting a base material of a titanium/titanium alloy having a known chemical composition and a known oxygen content;
   selecting a filler metal having the same chemical composition as the base material and having an oxygen content that is less than the oxygen content of the base material;
   striking an arc between the filler material and the base material to form a weldment molten pool;
   providing an inert gas shield for the molten weld pool.

2. The method of claim 1, including using argon as the inert gas.

3. The method of claim 1, including forming the base material with an oxygen content of no more than 0.30 percent.

4. The method of claim 1, including forming the filler material in a wire shape.

5. The method of claim 1, including selecting the base material from the following: Ti-6A1-4V and Ti-6A1-4V ELI.

6. A welder for welding a base material, the base material being a titanium or titanium alloy, the titanium/titanium alloy having a known chemical composition and a known oxygen content, comprising:
   a filler metal having the same chemical composition as the base material and having an oxygen content that is less than the oxygen content of the base material; and
   an inert gas providing a shield for the filler material at a site of a molten weld pool.

7. The welder of claim 6, the inert gas being argon.

8. The welder of claim 6, the base material having an oxygen content of no more than 0.30 percent.

9. The welder of claim 6, the filler material being formed in a wire shape.

10. The welder of claim 6, the base material being selected from the following: Ti-A1-4V and Ti-6A1-4V ELI.

* * * * *